United States Patent
Ekambaram et al.

(10) Patent No.: US 10,229,318 B2
(45) Date of Patent: Mar. 12, 2019

(54) ACTIVITY-BASED ROBOTIC TESTING OF WEARABLE DEVICES

(71) Applicant: INTERNATIONAL BUSINESS MACHINES CORPORATION, Armonk, NY (US)

(72) Inventors: Vijay Ekambaram, Tamilnadu (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 15/437,758

(22) Filed: Feb. 21, 2017

(65) Prior Publication Data
US 2018/0239961 A1    Aug. 23, 2018

(51) Int. Cl.
*G06K 9/00* (2006.01)
*G06K 9/62* (2006.01)

(52) U.S. Cl.
CPC ..... *G06K 9/00664* (2013.01); *G06K 9/00342* (2013.01); *G06K 9/00718* (2013.01); *G06K 9/6215* (2013.01); *G06K 9/6218* (2013.01); *G06K 9/6267* (2013.01)

(58) Field of Classification Search
CPC ...... A61F 2/70; A61F 2/68; A61F 2002/6827; A61F 2002/701; A61F 2002/704; A61F 2/54; A61F 2/72; B25J 9/161; B25J 13/08; B25J 9/1697; G05B 19/048; G05B 2219/45172; G06T 7/20
See application file for complete search history.

(56) References Cited

U.S. PATENT DOCUMENTS

| 5,461,700 | A | 10/1995 | Kimura et al. |
| 8,874,265 | B2 * | 10/2014 | Rakshit ............... B25J 9/1669 700/250 |
| 9,056,396 | B1 * | 6/2015 | Linnell ............... G05B 19/427 |
| 9,717,607 | B1 * | 8/2017 | Bostick ............... A61F 2/70 |
| 9,731,420 | B1 * | 8/2017 | Yarlagadda ............ B25J 9/1697 |

(Continued)

FOREIGN PATENT DOCUMENTS

WO    WO2012051654 A1    4/2012

OTHER PUBLICATIONS

Peter Mell et al, The NIST Definition of Cloud Computing, National Institute of Standards and Technology, Publication 800-145, 2011.
(Continued)

*Primary Examiner* — Amir Alavi
(74) *Attorney, Agent, or Firm* — Patrick J. Daugherty; Daugherty & Del Zoppo Co., LPA

(57) ABSTRACT

Aspects create test cases executable by a robot device to simulate user motion activity. Video analytics extract motion patterns from video image data of a user performing an activity associated with a wearable personal programmable device executing a device application. The extracted motion patterns are classified to an activity motion modality by matching an associated motion pattern model. Commonalities of the extracted motion patterns across other motion activity image data classified with the same matching activity motion modality are clustered into test case model motion pattern sets that are used to generate test case model robotic instructions for use by a robot device to execute and thereby replicate user motions represented by the extracted motion patterns.

20 Claims, 4 Drawing Sheets

(56) References Cited

U.S. PATENT DOCUMENTS

| | | | | |
|---|---|---|---|---|
| 9,925,669 | B2* | 3/2018 | Linnell | B25J 9/1664 |
| 2011/0301751 | A1* | 12/2011 | Gao | B25J 9/104 |
| | | | | 700/245 |
| 2014/0065586 | A1 | 3/2014 | Gabbai | |
| 2016/0026560 | A1 | 1/2016 | Jackson et al. | |
| 2017/0008174 | A1* | 1/2017 | Rosen | B25J 9/1697 |
| 2017/0277179 | A1* | 9/2017 | Bhageria | G05D 1/0027 |
| 2017/0361460 | A1* | 12/2017 | Boss | B25J 9/16 |
| 2018/0043532 | A1* | 2/2018 | Lection | B25J 9/1661 |

OTHER PUBLICATIONS

Simonite, Intel Robot Puts Touch Screens through Their Paces, https://www.technologyreview.com/s/601292/crisis-communication-after, 2013.

People & Blogs, 7Bot Desktgop Robot Arm—record and replay, https://www.youtube.com/watch?v=rUl9n-yR9hs, 2015.

Helppi, Textdroid, App Development and Testing on Wearables, http://testdroid.com/news/app-development-and-testing-on-wearables, 2015.

Rorschachuk, Movement recorder—record and playback a sequence of steps on a robotic arm, https://www.youtube.com/watch?v=Q967_9V6C-k, 2014.

Robot Kingdom, Robot Arm Record and Repeat Movements, https://www.youtube.com/watch?v=QVsdaPGUn1o, 2013.

Thongkham, Software Testing: Key Trends to Keep an Eye on in 2015, Lean Testing, https://leantesting.com/resources/software-testing-trends-2015.

Thongkham, Wearable App Testing, crowdsourcedtesting, https://crowdsourcedtesting.com/resources/wearable-app-testing, 2014.

Applause App Quality, Inc., Testing Wearables, http://www.applause.com/wearables, 2016.

Hale et al, SecuWear: An open source, multi-component hardware/software platform for exploring wearable security, 2015 IEEE International Conference on Mobile Services, IEEE Computer Society, 2015.

Apple, Apple invents a new Robotic Arm Testing System for the iPhone and introduces a new iPhone Antenna that Adds NFC, http://www.patentlyapple.com/patently-apple/2014/05.

JD Alois, Crowdfunding Mailbox: Antelope Muscle Activating Wearables, Blocks Modular Smartwatch & Dobot Robotic Arm, http://www.crowdfundinsider.com/2015/10/75919-crowdfunding-mailbox, 2015.

Grupohdi, A New Paradigm in Software Quality, Robotic Arm Testing, http://www.grupohdi.com/webnew/robotic1.html, 2014.

* cited by examiner

ACTIVITY-BASED ROBOTIC TESTING OF WEARABLE DEVICES

BACKGROUND

Programmable device applications may be stress-tested by deploying the devices and applications in a variety of real-life settings to observe the behavior of the devices and applications. Such mechanisms may be intended to ensure that said devices and applications meet "Application Under Test" (AUT) demands and standards, in order that the devices and applications may be expected to perform satisfactorily when deployed in the marketplace and other real life scenarios.

Examples of stress or context-based testing include observing the behavior of applications with high computational tasks. For example, gaming applications with complex or demanding graphic requirements may be tested under a variety of different central processing unit (CPU) loads in order to identify defects or other unacceptable performance anomalies. Applications which do not follow proper memory management often crash when run under poor random access memory (RAM) availability contexts, and accordingly applications may be run in a variety of RAM availability contexts to detect and observe crashes indicative of improper memory management.

Mobile applications that use the Internet may be tested in various network loading conditions: for example, executing time-consuming actions in a main user interface (UI) thread may lead to application crashes. Applications that use global positioning satellite (GPS) data may be tested under various contexts that affect GPS data signals, including within and without building structures in order to observe location accuracy behaviors when GPS signals are blocked by building structures.

BRIEF SUMMARY

In one aspect of the present invention, a method for creating a test case executable by a robot device to simulate user motion activity executes on a computer processor steps that include extracting (for example, via video analytics) motion patterns of a user from video image data of the user performing an activity that is associated with the user wearing a personal programmable device that is executing a device application. The extracted motion patterns are classified into a matching one of a plurality of different activity motion modalities of the user, as a function of matching the extracted motion patterns to a motion pattern model that is associated with the matching activity motion modality. Commonality motion patterns of the extracted motion patterns are identified as in common with other motion patterns that are extracted from other motion activity image data of another user activity performance that is classified with the same matching activity motion modality. The identified commonality motion patterns are clustered (the extracted motion patterns with the common other motion patterns) into a set of test case model motion patterns for the classified motion pattern modality. Test case model robotic instructions are generated from the set of test case model motion patterns, for use by a robot device to execute and thereby replicate user motions represented by the extracted motion patterns.

In another aspect, a system has a hardware processor in circuit communication with a computer readable memory and a computer-readable storage medium having program instructions stored thereon. The processor executes the program instructions stored on the computer-readable storage medium via the computer readable memory and thereby extracts (for example, via video analytics) motion patterns of a user from video image data of the user performing an activity that is associated with the user wearing a personal programmable device that is executing a device application. The extracted motion patterns are classified into a matching one of a plurality of different activity motion modalities of the user, as a function of matching the extracted motion patterns to a motion pattern model that is associated with the matching activity motion modality. Commonality motion patterns of the extracted motion patterns are identified as in common with other motion patterns that are extracted from other motion activity image data of another user activity performance that is classified with the same matching activity motion modality. The identified commonality motion patterns are clustered (the extracted motion patterns with the common other motion patterns) into a set of test case model motion patterns for the classified motion pattern modality. Test case model robotic instructions are generated from the set of test case model motion patterns, for use by a robot device to execute and thereby replicate user motions represented by the extracted motion patterns.

In another aspect, a computer program product for creating a test case executable by a robot device to simulate user motion activity has a computer-readable storage medium with computer readable program code embodied therewith. The computer readable hardware medium is not a transitory signal per se. The computer readable program code includes instructions for execution which cause the processor to extract (for example, via video analytics) motion patterns of a user from video image data of the user performing an activity that is associated with the user wearing a personal programmable device that is executing a device application. The extracted motion patterns are classified into a matching one of a plurality of different activity motion modalities of the user, as a function of matching the extracted motion patterns to a motion pattern model that is associated with the matching activity motion modality. Commonality motion patterns of the extracted motion patterns are identified as in common with other motion patterns that are extracted from other motion activity image data of another user activity performance that is classified with the same matching activity motion modality. The identified commonality motion patterns are clustered (the extracted motion patterns with the common other motion patterns) into a set of test case model motion patterns for the classified motion pattern modality. Test case model robotic instructions are generated from the set of test case model motion patterns, for use by a robot device to execute and thereby replicate user motions represented by the extracted motion patterns.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
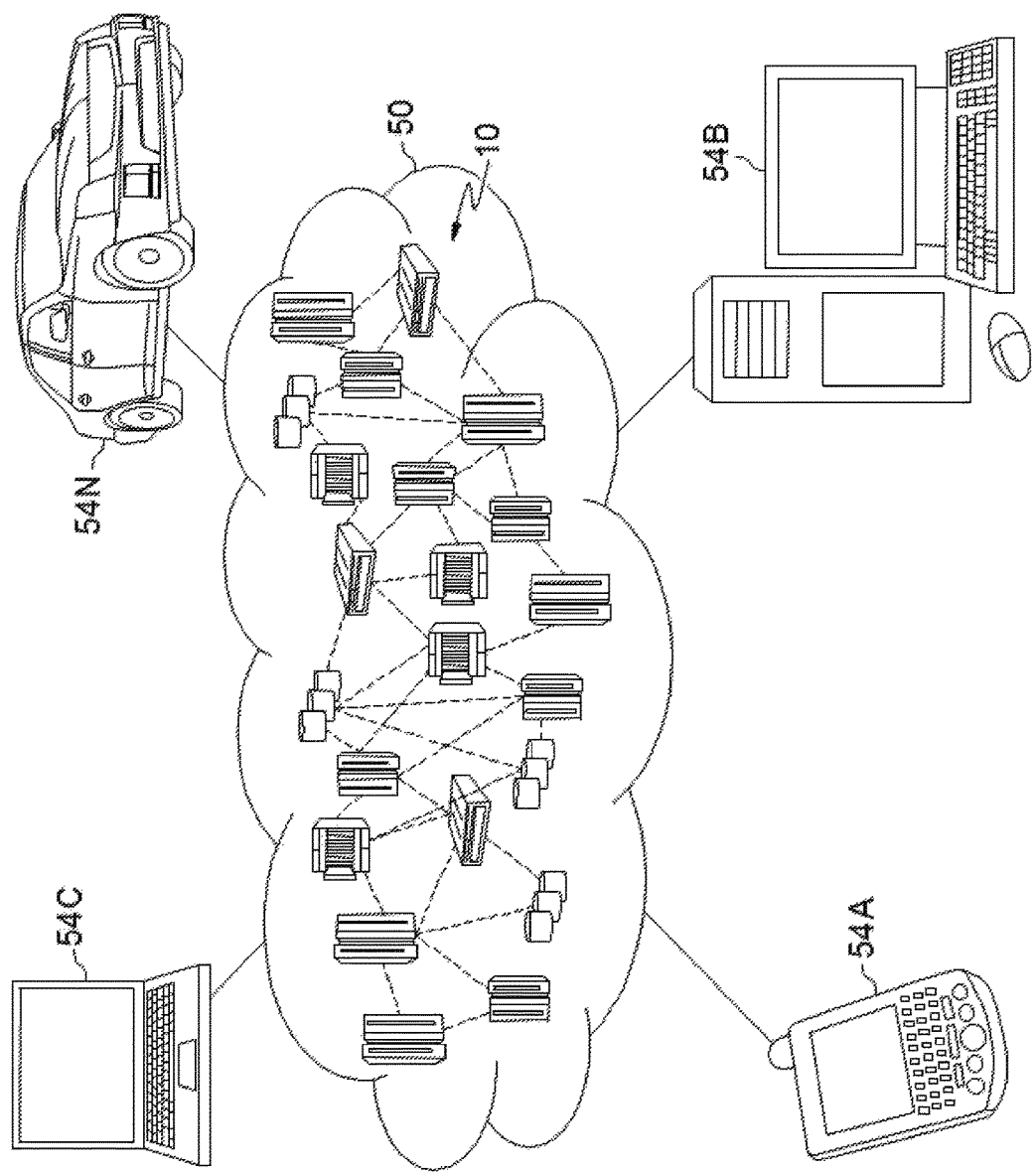
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
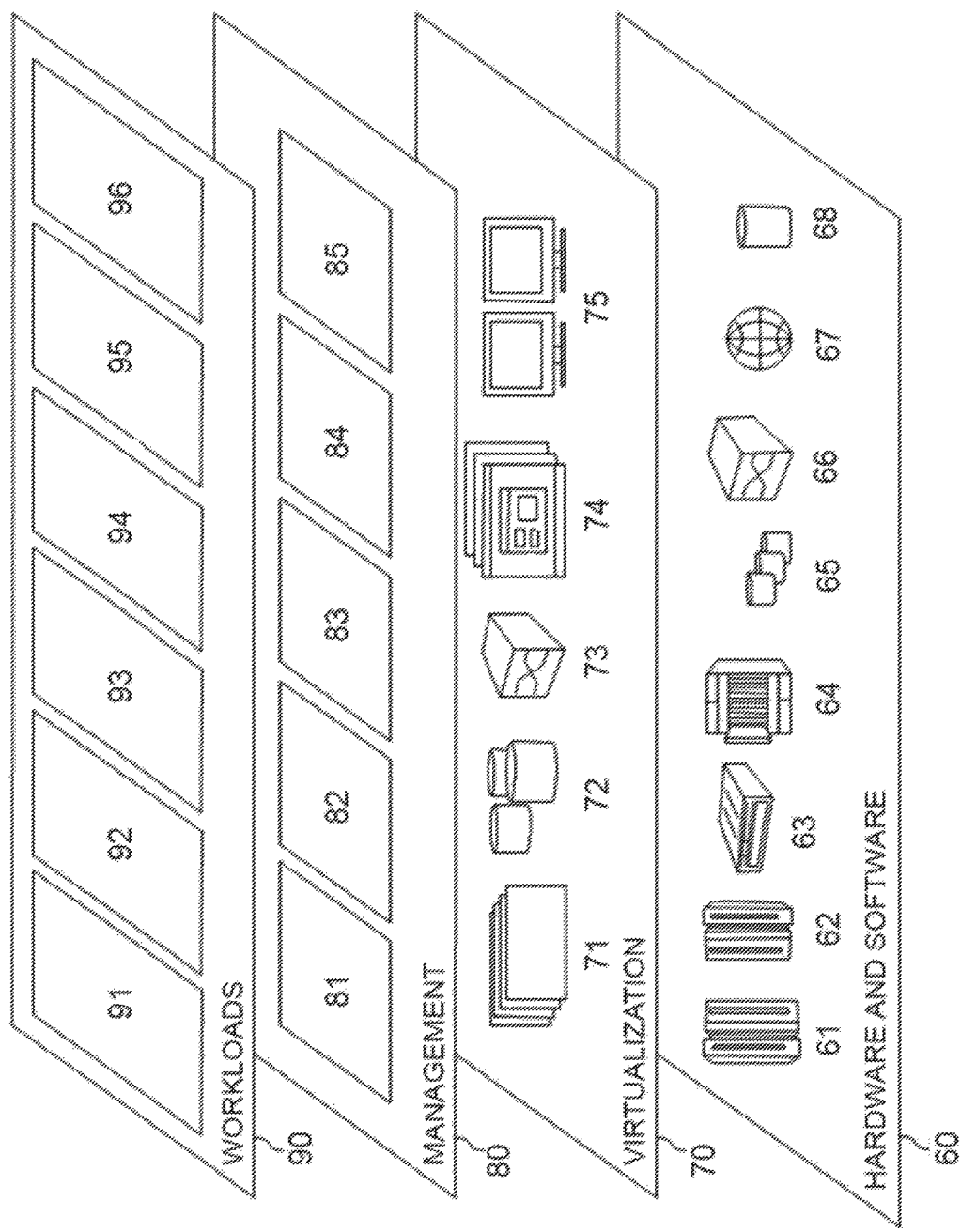
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
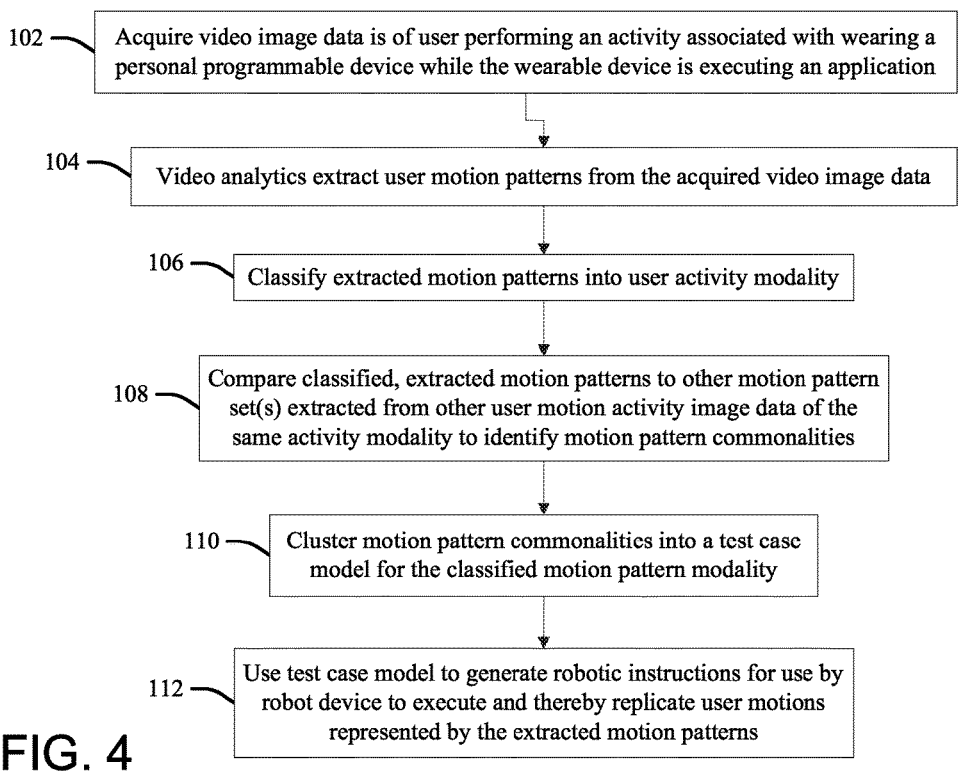
FIG. 4 is a flow chart illustration of a process or system according to an embodiment of the present invention for creating a test case that is executable by a robot device to simulate user motion activity during deployment of a wearable, programmable device.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 according to embodiments of the present invention, for example to execute the process steps or system components or tasks as depicted in FIG. 4 below.

Figure 3:
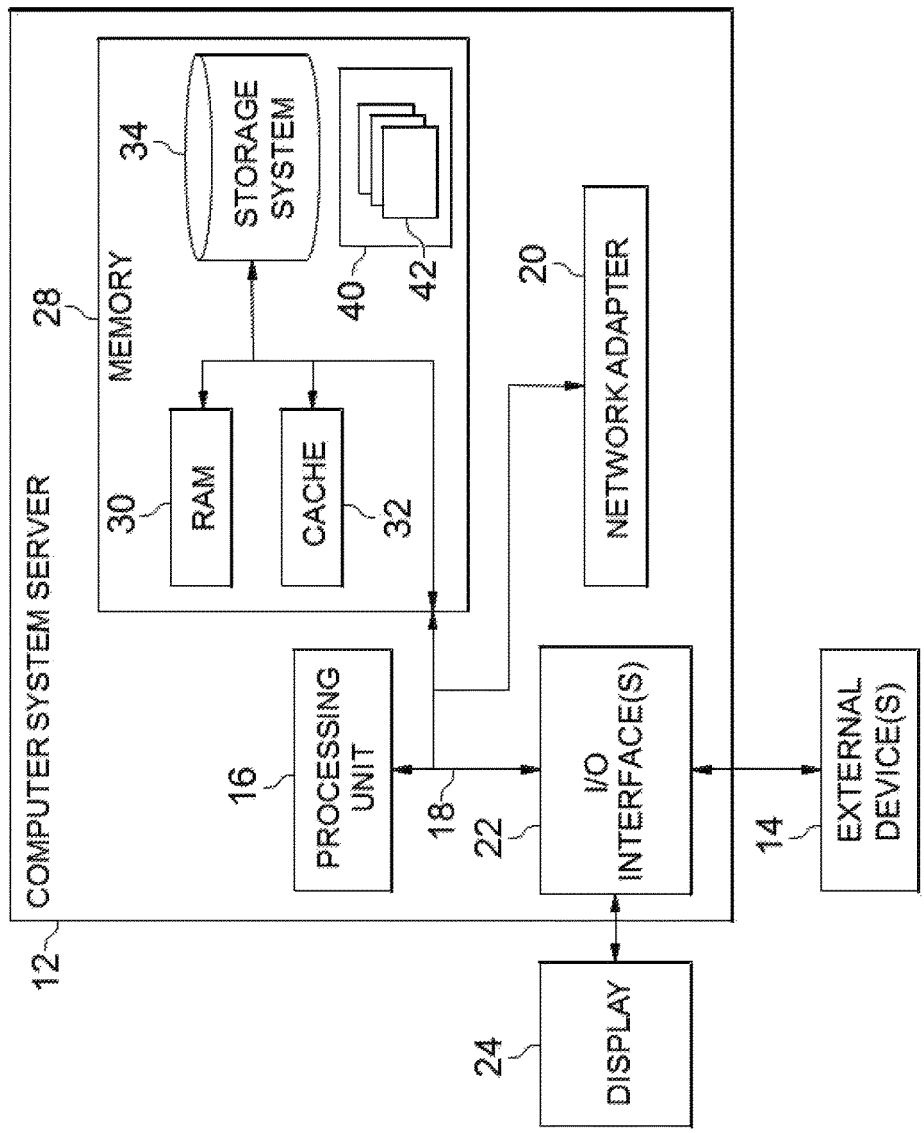
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients,/ hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention for creating a test case that is executable by a robot device to simulate user motion activity during deployment of a wearable, programmable device. At 102 video image data is acquired (in real-time via camera, scanner or other visual information capture device, or from historic data stored on a storage device, etc.) of a user activity that is associated with (may be performed or is performed while) wearing a personal programmable device (a "wearable device") that is executing an application.

For example, the wearable device may be an activity tracker device that is located on the user (strapped to a wrist of the user, or to the user's chest, or attached to a shoe or carried in a pocket, etc.) while the user is engaged in a motion activity (walking, running, swimming, golfing, playing football, rowing, cycling, etc.), and wherein the device is executing an activity tracking application (estimating or measuring a speed of travel of the user during the activity, a number of steps taken by the user, the user's heat rate, respiration rate, etc.). The acquired video is of motions performed for which wearing the device is intended; however, the device need not be worn during the motions depicted: for example, a person jogging in the video may or may not be actually wearing the device, but wherein the device and its executing application are intended to measure user performance attributes of the jogging activity.

At 104 video analytics extract user motion patterns from the acquired video image data.

At 106 the extracted motion patterns are classified into a type or modality of user activity as a function of matching a motion pattern model of the matching type or modality of user activity: for example, as a running, swimming, bicycling, etc. motion modality. In some aspects, that is accomplished by comparing or fitting the extracted motion patterns to different motion models that are each associated with different ones of the activity motion modalities, and selecting the modality that best fits the extracted motions: for example, if 90% of the extracted motions fit a model of motions extracted from images of a swimmer performing a back stroke, and 70% fit a model of motions extracted from images of a swimmer performing a breast stroke, then the extracted motion patterns may be classified into a back stroke modality.

In some examples, models are applied to extract motion pattern image data from the acquired video image data at 104 that match or otherwise meet threshold conditions of the model, thereby filtering the extracted data into motion patterns that conform to specific data formats or values.

At 108 the classified, extracted motion patterns are compared to one or more other motion pattern sets that are extracted from motion activity image data of other user performances of the same activity modality (for example, other back stroke videos, or more generically of other videos of swimming motions regardless of category of stroke performed) in order to identify motion pattern commonalities.

At 110 the motion pattern commonalities are clustered into a test case model for the classified motion pattern modality (for example, a back stroke test case, or a generic swimming stroke test case).

At 112 the test case model is used to generate (as a basis for) robotic instructions for use by a robot device to execute and thereby replicate user motions represented by the clustered motion pattern commonalities of the test case model.

Thus, aspects of the present invention may learn various human activity modalities from video data acquired from the performances of real users in various sport scenarios. Utilizing AUT processes aspects may create test cases or clear-scripts for humanoid-robots to replicate these captured activities and learned modalities. In some examples, databases are created and maintained comprising test cases for each of a plurality of different sport or other activity scenarios. For each test case, when executed a robotic will replicate the actions forming the basis of the executed test case.

Thus, aspects of the present invention may offer robotic testing services through cloud infrastructure for real-life stress testing of wearable devices and their executing applications. Robot cloud infrastructures may maintain sets of robots which users may hire for testing purposes, running test cases derived from the process or system of FIG. 4 on robots wearing wearable devices executing applications under test. Users may thereby generate test case result reports for every test case execution.

In some aspects, cognitive analysis of AUT metadata enables robotic regression test-automation to effectively detect defects in an AUT. Testers may upload a wearable device application with description metadata to a robotic testing service according to the present invention, wherein the testing service does a requirement analysis on the metadata of an application to identify applicable test case models for use in testing scenarios involving deployment of the wearable device application. Testing services may also consider user feedback inputs, including from social networking sites, to improve accuracy in identifying and choosing appropriate test case models that meet the user requirements in assessing the testing devices and applications.

When a robot is selected from the robotic cloud, a wearable device executing the application of interest is installed onto ("worn by") the robot so that the motion of the robot will be similar to (approximate) the motion of the device while worn by a human user in performing the activity of the classified modality. The robot may execute a plurality of different tests, of the same or different modalities, one test case after another or simultaneously in executing the actions defined by each test case, wherein considered in combination the plurality of executed test cases may define a complete snapshot of a complex user motion comprising multiple different activity modalities, capturing performance of the device and executing applications during multiple action states during the robotic test case execution. Subsequent to completion of the test case executions, test reports may be generated correlating the robotic actions with the logs or snapshots of activities collected in the wearable device, by the executing application or some other application.

Stress testing of sport-based wearable device applications may be highly dependent on the specific user activity involved. For example, the accurate performance or assessment of wearable device applications related to swimming may be dependent upon a user engaging in motions that are relevant to the activity, wherein test cases involving the performance by a human or robot of unrelated activities (for example, walking, jogging, etc.), or of non-stroke activities (for example, wading or floating) may not generate meaningful data or impart useful stress test exposures to the wearable device to adequately assess the performance of the device or application during a target, end-user activity for which the device and application are intended. Accordingly, some aspects generate "corner-case" test case at step 112 of FIG. 4 that define specific and relevant human activity patterns within a generic activity modality that must be executed to generate a complete test assessment by use of a robot.

Corner cases may also define robot activities or motions that are dangerous or otherwise inappropriate for a human tester to execute, but that are useful in stress testing the device or device application. For example, a robot may violently shake a wearable device in order to determine if the device can withstand certain extreme forces that a human user might perform while falling, or while unintentionally moving so quickly or forcefully as to risk injury, wherein the user would expect the device or application to continue to function even if such dangerous or disfavored activities were engaged in by an end user.

Aspects may learn and extract motion patterns from various sources, including crowd-sourced online videos, thereby creating, refining and maintaining large databases of test case data sets for various user actions with respect to a wide variety of sports and other user activities. In this way, aspects may enable exhaustive testing in various real-life scenarios which cannot be realistically performed and offered by manual testing under the prior art.

Robots may also replicate actions with high accuracy. Accordingly, testing by aspects of the present invention may replicate test cases a large number of times with the same accuracy, ensuring a consistent testing regimen which cannot be replicated by manual user testing.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating a test case executable by a robot device to simulate user motion activity, comprising executing on a computer processor the steps of:

classifying motion patterns of a user that are extracted from video image data of the user performing an activity while wearing a personal programmable device that is executing a device application into a matching one of a plurality of different activity motion modalities of the user, as a function of matching the extracted motion patterns to a motion pattern model that is associated with the matching activity motion modality;

identifying commonality motion patterns of the extracted motion patterns that are common with other motion patterns that are extracted from other motion activity image data of another user activity performance that is classified with the same matching activity motion modality;

clustering the identified commonality motion patterns of the extracted motion patterns with the common other motion patterns into a set of test case model motion patterns for the classified motion pattern modality; and generating test case model robotic instructions from the set of test case model motion patterns for use by a robot device to execute and thereby replicate user motions while wearing the personal programmable device as represented by the extracted motion patterns.

2. The method of claim 1, wherein the step of classifying the extracted motion patterns into the matching activity motion modality comprises:

fitting the extracted motion patterns to different motion models that are each associated with different ones of the activity motion modalities; and selecting as the matching activity motion modality the one of the plurality of different activity motion modalities of the user for which the associated motion model best fits the extracted motion patterns.

3. The method of claim 1, wherein the other motion activity image data of the another user activity performance is a crowd-sourced online video.

4. The method of claim 1, wherein the personal programmable device is an activity tracker device that is located on the user while the user is engaged in a motion activity correlated to the matching activity motion modality for which the device is executing an activity tracking application that estimates or measures a user performance attribute of the motion activity.

5. The method of claim 1, wherein the different activity motion modalities of the user are selected from the group consisting of walking, running, swimming, golfing, playing football, rowing, and cycling.

6. The method of claim 1, further comprising:

extracting, via video analytics, the motion patterns of the user from the video image data of the user performing the activity that is associated with the user wearing the personal programmable device that is executing the device application.

7. The method of claim 1, further comprising:

integrating computer-readable program code into a computer system comprising a processor, a computer readable memory and a computer readable storage medium, wherein the computer readable program code is embodied on the computer readable storage medium and comprises instructions that, when executed by the processor via the computer readable memory, cause the processor to perform the steps of extracting the motion patterns of the user from video image data of the user, classifying the extracted motion patterns into the matching one of the different activity motion modalities of the user, identifying the commonality motion patterns, clustering the identified commonality motion patterns with the common other motion patterns into the set of test case model motion patterns for the classified motion pattern modality, and generating the test case model robotic instructions from the set of test case model motion patterns.

8. The method of claim 7, wherein the computer-readable program code is provided as a service in a cloud environment.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
classifies motion patterns of a user that are extracted from video image data of the user performing an activity while wearing a personal programmable device that is executing a device application into a matching one of a plurality of different activity motion modalities of the user, as a function of matching the extracted motion patterns to a motion pattern model that is associated with the matching activity motion modality;
identifies commonality motion patterns of the extracted motion patterns that are common with other motion patterns that are extracted from other motion activity image data of another user activity performance that is classified with the same matching activity motion modality;
clusters the identified commonality motion patterns of the extracted motion patterns with the common other motion patterns into a set of test case model motion patterns for the classified motion pattern modality; and
generates test case model robotic instructions from the set of test case model motion patterns for use by a robot device to execute and thereby replicate user motions while wearing the personal programmable device as represented by the extracted motion patterns.

10. The system of claim 9, wherein the program instructions are provided as a service in a cloud environment.

11. The system of claim 9, wherein the processor executes the program instructions stored on the computer-readable storage medium via the computer readable memory and thereby classifies the extracted motion patterns into the matching activity motion modality by:
fitting the extracted motion patterns to different motion models that are each associated with different ones of the activity motion modalities; and
selecting as the matching activity motion modality the one of the plurality of different activity motion modalities of the user for which the associated motion model best fits the extracted motion patterns.

12. The system of claim 9, wherein the other motion activity image data of the another user activity performance is a crowd-sourced online video.

13. The system of claim 9, wherein the personal programmable device is an activity tracker device that is located on the user while the user is engaged in a motion activity correlated to the matching activity motion modality for which the device is executing an activity tracking application that estimates or measures a user performance attribute of the motion activity.

14. The system of claim 9, wherein the different activity motion modalities of the user are selected from the group consisting of walking, running, swimming, golfing, playing football, rowing, and cycling.

15. The system of claim 9, wherein the processor executes the program instructions stored on the computer-readable storage medium via the computer readable memory and thereby extracts via video analytics the motion patterns of the user from the video image data of the user performing the activity that is associated with the user wearing the personal programmable device that is executing the device application.

16. A computer program product for creating a test case executable by a robot device to simulate user motion activity, the computer program product comprising:
a computer readable storage medium having computer readable program code embodied therewith, wherein the computer readable storage medium is not a transitory signal per se, the computer readable program code comprising instructions for execution by a processor that cause the processor to:
classify motion patterns of a user that are extracted from video image data of the user performing an activity while wearing a personal programmable device that is executing a device application into a matching one of a plurality of different activity motion modalities of the user, as a function of matching the extracted motion patterns to a motion pattern model that is associated with the matching activity motion modality;
identify commonality motion patterns of the extracted motion patterns that are common with other motion patterns that are extracted from other motion activity image data of another user activity performance that is classified with the same matching activity motion modality;
cluster the identified commonality motion patterns of the extracted motion patterns with the common other motion patterns into a set of test case model motion patterns for the classified motion pattern modality; and
generate test case model robotic instructions from the set of test case model motion patterns for use by a robot device to execute and thereby replicate user motions while wearing the personal programmable device as represented by the extracted motion patterns.

17. The computer program product of claim 16, wherein the computer readable program code instructions for execution by the processor further cause the processor to classify the extracted motion patterns into the matching activity motion modality by:
fitting the extracted motion patterns to different motion models that are each associated with different ones of the activity motion modalities; and
selecting as the matching activity motion modality the one of the plurality of different activity motion modalities of the user for which the associated motion model best fits the extracted motion patterns.

18. The computer program product of claim 16, wherein the other motion activity image data of the another user activity performance is a crowd-sourced online video.

19. The computer program product of claim 16, wherein the personal programmable device is an activity tracker device that is located on the user while the user is engaged in a motion activity correlated to the matching activity motion modality for which the device is executing an activity tracking application that estimates or measures a user performance attribute of the motion activity.

20. The computer program product of claim 16, wherein the different activity motion modalities of the user are selected from the group consisting of walking, running, swimming, golfing, playing football, rowing, and cycling.

\* \* \* \* \*